United States Patent
Kim et al.

(10) Patent No.: US 10,545,645 B2
(45) Date of Patent: *Jan. 28, 2020

(54) METHOD FOR REALIZING USER INTERFACE USING CAMERA AND MOBILE COMMUNICATION TERMINAL FOR THE SAME

(71) Applicant: Samsung Electronics Co., Ltd., Gyeonggi-do (KR)

(72) Inventors: Soon-Ok Kim, Seoul (KR); Dae-Gyu Kim, Daegu (KR); Yong-Soo Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,751

(22) Filed: Dec. 4, 2017

(65) Prior Publication Data

US 2018/0088782 A1    Mar. 29, 2018

Related U.S. Application Data

(63) Continuation of application No. 14/604,191, filed on Jan. 23, 2015, now Pat. No. 9,386,196, which is a
(Continued)

(30) Foreign Application Priority Data

Jun. 20, 2005    (KR) .................. 10-2005-0053254

(51) Int. Cl.
*H04M 1/00*    (2006.01)
*G06F 3/0484*    (2013.01)
(Continued)

(52) U.S. Cl.
CPC .......... *G06F 3/04842* (2013.01); *A63F 13/06* (2013.01); *A63F 13/213* (2014.09);
(Continued)

(58) Field of Classification Search
CPC .............. H04N 7/147; H04M 1/72583; H04M 1/72522; A63F 13/213; A63F 13/332;
(Continued)

(56) References Cited

U.S. PATENT DOCUMENTS 5,076,584 A    12/1991    Openiano
5,684,715 A    11/1997    Palmer
(Continued)

FOREIGN PATENT DOCUMENTS

CA    WO 0207839 A2 *    1/2002    .............. G06F 3/011
CN    1232204    10/1999
(Continued)

OTHER PUBLICATIONS

OneLook Dictionary Search, Definitions of mode and module, http://www.onelook.com, 2 pages, Apr. 26, 2010.
(Continued)

*Primary Examiner* — Mahendra R Patel
(74) *Attorney, Agent, or Firm* — The Farrell Law Firm, P.C.

(57) ABSTRACT

A method for realizing a user interface using a camera module and a mobile communication terminal for the same. If a user makes a predetermined motion in a state in which the camera module of the mobile communication terminal is activated, the mobile communication terminal performs a predetermined action according to the motion pattern by recognizing the user motion and patterning the motion. In this case, the action performed according to the motion pattern corresponds to mouse control in a mouse mode, game control in a game mode, and character input in a character input mode.

20 Claims, 4 Drawing Sheets

Related U.S. Application Data continuation of application No. 14/221,966, filed on Mar. 21, 2014, now Pat. No. 8,965,452, which is a continuation of application No. 11/471,359, filed on Jun. 20, 2006, now Pat. No. 8,694,053.

(51) Int. Cl.

| | | |
|---|---|---|
| *A63F 13/42* | (2014.01) | |
| *A63F 13/213* | (2014.01) | |
| *A63F 13/20* | (2014.01) | |
| *H04N 7/14* | (2006.01) | |
| *H04M 1/725* | (2006.01) | |
| *G06F 3/0482* | (2013.01) | |
| *A63F 13/332* | (2014.01) | |

(52) U.S. Cl.
CPC ............ *A63F 13/42* (2014.09); *G06F 3/0482* (2013.01); *H04M 1/72522* (2013.01); *H04M 1/72583* (2013.01); *H04N 7/147* (2013.01); *A63F 13/332* (2014.09); *A63F 2300/1093* (2013.01); *A63F 2300/204* (2013.01); *A63F 2300/406* (2013.01); *A63F 2300/6045* (2013.01)

(58) Field of Classification Search
CPC ........ A63F 2300/1093; A63F 2300/204; A63F 2300/6045; A63F 2300/406; A63F 13/42; G06F 3/0484; G06F 3/0354; G06F 17/30; G06F 3/0482; G06F 3/04842; H04W 12/06
USPC ............ 455/566, 566.1, 566.2; 370/335, 342
See application file for complete search history.

(56) References Cited

U.S. PATENT DOCUMENTS

| | | | |
|---|---|---|---|
| 6,043,805 A | 3/2000 | Hsieh | |
| 6,498,628 B2 * | 12/2002 | Iwamura | G08C 23/00 345/157 |
| 6,850,252 B1 * | 2/2005 | Hoffberg | G06K 9/00369 348/E7.061 |
| 7,058,204 B2 * | 6/2006 | Hildreth | G06K 9/00375 382/103 |
| 7,098,772 B2 | 8/2006 | Cohen | |
| 7,426,467 B2 * | 9/2008 | Nashida | G06F 3/16 348/E7.061 |
| 7,584,280 B2 * | 9/2009 | Kim | H04L 12/2803 709/202 |
| 7,708,641 B2 * | 5/2010 | Tawara | A63F 13/10 345/173 |
| 8,098,935 B2 * | 1/2012 | Song | G06K 7/14 382/181 |
| 2002/0041327 A1 * | 4/2002 | Hildreth | G06F 3/011 348/42 |
| 2002/0094028 A1 * | 7/2002 | Kimoto | H04N 19/176 375/240.14 |
| 2002/0097218 A1 * | 7/2002 | Gutta | G06F 3/0304 345/156 |
| 2002/0103024 A1 | 8/2002 | Jeffway et al. | |
| 2002/0140822 A1 * | 10/2002 | Kahn | G01S 17/42 348/207.99 |
| 2002/0168107 A1 | 11/2002 | Tang et al. | |
| 2003/0009517 A1 * | 1/2003 | Wang | G06F 17/218 709/203 |
| 2003/0075598 A1 | 4/2003 | Boccacci | |
| 2003/0128287 A1 * | 7/2003 | Fredlund | H04N 1/00137 348/333.02 |
| 2003/0138130 A1 | 7/2003 | Cohen et al. | |
| 2003/0231167 A1 * | 12/2003 | Leung | G06F 3/04883 345/173 |
| 2005/0030048 A1 | 2/2005 | Bolender et al. | |
| 2005/0162402 A1 | 7/2005 | Watanachote | |
| 2005/0216867 A1 * | 9/2005 | Marvit | G06F 1/1613 715/863 |
| 2005/0283532 A1 * | 12/2005 | Kim | H04L 12/2803 709/225 |
| 2008/0094354 A1 * | 4/2008 | Thelen | G06F 3/0346 345/157 |
| 2009/0005167 A1 * | 1/2009 | Arrasvuori | A63H 33/042 463/40 |

FOREIGN PATENT DOCUMENTS

| | | | | |
|---|---|---|---|---|
| EP | 1050010 A1 * | 11/2000 | ............. | G06F 3/014 |
| EP | 1 139 286 | 10/2001 | | |
| GB | 2373943 A * | 10/2002 | ............. | G01S 17/42 |
| GB | 2398691 | 8/2004 | | |
| JP | 11328312 | 11/1999 | | |
| JP | 2000196914 A * | 7/2000 | | |
| JP | 2002-027315 | 1/2002 | | |
| JP | 2003-067177 | 3/2003 | | |
| JP | 2004-164609 | 6/2004 | | |
| JP | 2004-328549 | 11/2004 | | |
| KR | 2020009014926 | 7/2000 | | |
| KR | 10-2002-0017576 | 3/2002 | | |
| KR | 1020030021988 | 3/2003 | | |
| KR | 10-2004-0027803 | 4/2004 | | |
| KR | 10-2004-0081088 | 9/2004 | | |
| KR | 10-2005-0095152 | 9/2005 | | |
| RU | 2002128145 | 2/2004 | | |
| WO | WO-9412255 A1 * | 6/1994 | ............. | A63F 13/10 |
| WO | WO 00/24131 | 4/2000 | | |
| WO | WO 0229722 A2 * | 4/2002 | ......... | G06K 9/00375 |
| WO | WO 03100994 A2 * | 12/2003 | ............. | G08C 17/02 |

OTHER PUBLICATIONS

Indian Examination Report dated Mar. 7, 2019 issued in counterpart application No. 9899/DELNP/2007, 3 pages.

* cited by examiner

METHOD FOR REALIZING USER INTERFACE USING CAMERA AND MOBILE COMMUNICATION TERMINAL FOR THE SAME

PRIORITY

This application is a Continuation Application of U.S. application Ser. No. 14/604,191, filed in the U.S. Patent and Trademark Office on Jan. 23, 2015 and issued as U.S. Pat. No. 9,836,196 on Dec. 5, 2017, which is a Continuation Application of U.S. application Ser. No. 14/221,966, filed in the U.S. Patent and Trademark Office on Mar. 21, 2014 and issued as U.S. Pat. No. 8,965,452 on Feb. 24, 2015, which is a Continuation Application of U.S. application Ser. No. 11/471,359, filed in the U.S. Patent and Trademark Office on Jun. 20, 2006, and issued as U.S. Pat. No. 8,694,053 on Apr. 8, 2014, and claims priority to an application entitled "Method for Realizing User Interface Using Camera and Mobile Communication Terminal For The Same" filed in the Korean Intellectual Property Office on Jun. 20, 2005 and assigned Serial No. 10-2005-0053254, the content of each of which are incorporated herein by reference.

BACKGROUND OF THE INVENTION

1. Field of the Invention

The present invention relates to a method for realizing a user interface using a camera module and a mobile communication terminal for the same.

2. Description of the Related Art

Recently, as a mobile communication terminals have become wide spread, a variety of services have become available such as a traffic information service for informing a user who is driving a vehicle of traffic conditions through the screen of the mobile communication terminal, a MYBELL service (enabling the user to register the user's own ringing sound in the mobile communication terminal and to use the ringing sound), and a mobile telephone call service for notifying the arrival of a message on a voice mail-box. The user of the mobile communication terminal can receive a variety of convenient functions in addition to an intrinsic telephone communication function because the mobile communication terminal is designed to receive a variety of additional services, such as a voice mail-box function and a specific information-receiving function, from a service provider.

As such services and additional functions have become increasingly expanded, a mobile communication system provides an Integrated Services Digital Network (IDSN)—level multimedia service with a data rate of several Mb/s, as well as voice and data. A terminal adaptable for the mobile communication system described above has been developed. A mobile communication terminal equipped with a camera capable of storing an image obtained by photographing a subject is introduced as one example of the development.

As the mobile communication terminal becomes popularized, a user can take a picture regardless of time and location using the mobile communication terminal. In addition, since the mobile communication terminal always carried by a user is equipped with a camera, the user may photograph an emergent situation or may take a picture whenever it is required.

Accordingly, it is desirable to utilize the mobile communication terminal equipped with the camera with more effect and through various additional schemes based on the above described advantages. In addition, it is necessary to add a variety of services and additional functions to the mobile communication terminal equipped with the camera in order to enhance the usage efficiency of the mobile communication terminal and satisfy a variety of user demands. For example, an optical character recognition (OCR) function enables the mobile communication terminal to recognize phone numbers and data printed in a document by using the camera of the mobile communication terminal.

However, although a variety of applications are available when the mobile communication terminal is equipped with the camera, the use of the camera of the mobile communication terminal is limited for some functions, such as the OCR function.

SUMMARY OF THE INVENTION

Accordingly, the present invention has been made to solve the above-mentioned problems occurring in the prior art, and an object of the present invention is to provide a method for realizing a user interface using a camera module and a mobile communication terminal for the same.

To accomplish the above objects, an apparatus is provided that includes a processor-implemented controller that identifies an application activated in relation with the apparatus, identifies a gesture using a camera operatively coupled with the apparatus, performs a first function in response to the gesture if the application is a first application, and performs a second function in response to the gesture if the application is a second application.

Also provided is a method that identifies, at an electronic device, an application activated in relation with the electronic device, identifies a gesture using a camera operatively coupled with the electronic device, performs a first function in response to the gesture if the application is a first application, and performs a second function in response to the gesture if the application is a second application.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
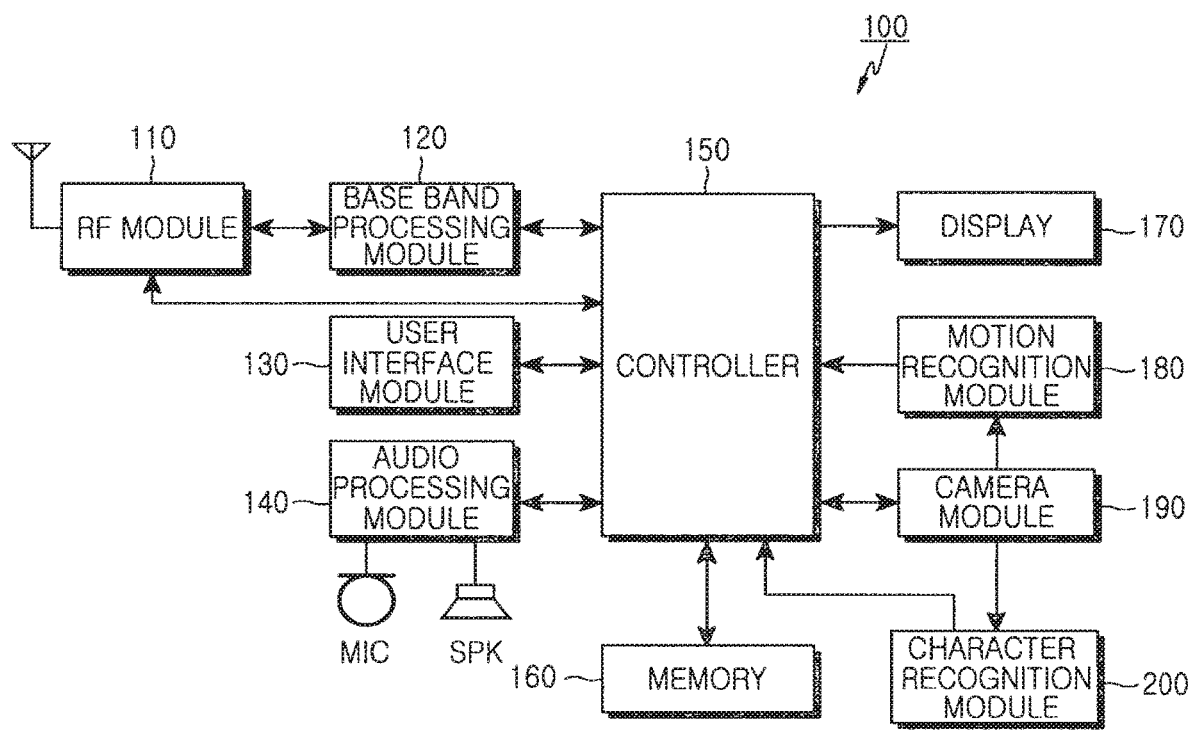
FIG. 1 is a block diagram illustrating a structure of a mobile communication terminal according to an embodiment of the present invention.

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

According to an embodiment of the present invention, it is possible to realize a user interface module using a camera module in a mobile communication terminal. If a user makes a predetermined motion during a state in which the camera module of the mobile communication terminal is activated, the mobile communication terminal recognizes and patterns the user motion and performs a predetermined action according to the motion pattern.

The action performed according to the motion pattern may correspond to the control of a mouse in a mouse mode or the control of a game in a game mode. In addition, the action may correspond to the input of a character in a character inputting mode.

Hereinafter, a block diagram illustrating the structure of a mobile communication terminal will be described with reference to FIG. 1.

FIG. 1 is a block diagram illustrating a structure of a mobile communication terminal 100 according to an embodiment of the present invention. The mobile communication terminal 100 includes a Radio Frequency (RF) module 110, a base band processing module 120, a user interface module 130, a audio processing module 140, a controller 150, a memory 160, a display 170, a motion recognition module 180, a camera module 190, and a character recognition module 200.

The controller 150 of the mobile communication terminal 100 provides overall control for the mobile communication terminal. In addition, the controller 150 controls each module shown in FIG. 1 in order to realize a user interface for operating the camera module according to a preferred embodiment of the present invention.

In a more detailed description of the operation of the controller 150, the controller 150 activates the camera module 190, recognizes a user motion through the camera module 190, and patterns the user motion.

The controller 150 reads out a mouse controlling command corresponding to a user motion pattern from the memory 160 in the mouse mode according to a first embodiment of the present invention. The user moves his/her hand according to a motion pattern within the photographic field of the camera module 190 of the mobile communication terminal 100. The motion pattern is preliminarily stored in the memory 160 and a control command corresponding to the motion pattern is also stored in the memory 160. If the user carries out the action of a predetermined motion pattern based on the storage of the motion pattern, the mobile communication terminal performs the control command corresponding to the motion pattern. For example, the user may carry out a click action or roll a mouse wheel as if the user actually handles the mouse. The controller 150 performs a control action such that the mouse control command, identical to that which occurs when the user actually clicks the mouse or rolls the mouse wheel, is issued with respect to the corresponding motion.

The controller 150 reads out from the memory 160 a game controlling command corresponding to a user motion in the game mode according to a second embodiment of the present invention. For example, if the user makes motions such as gripping, hitting, or moving by using his/her hand as if the user were actually playing a game, the controller 150 patterns the user motion and reads out from the memory 160 a game controlling command corresponding to the user motion pattern. The game controlling command is stored in the memory 160 in the same way that the motion pattern, corresponding to the game controlling command, is stored in the memory 160.

In addition, the controller 150 according to a third embodiment of the present invention reads out a character according to a trace corresponding to the user motion pattern so as to display the character on the display 170 in the character input mode. The user moves his/her hand within the photographic field of the camera module 190 of the mobile communication terminal 100 such that the motion pattern is created. For example, the user actually may move his/her hand as if he/she actually writes characters. Then, the controller 150 reads out from the memory 160 a character according to the trace corresponding to the user motion pattern so as to display the character on the display 170. This character inputting function is mainly used for a Short Message Service (SMS) message transmitting function, a memo pad, etc.

The camera module 190 photographs user movement (i.e., user motion) within the photographic field so as to provide the photographed image of the user motion to the controller 150, the motion recognition module 180, and the character recognition module 200. The motion recognition module 180 recognizes and patterns the user motion and then provides the user motion to the controller 150. In addition, the character recognition module 200 creates a trace corresponding to the user motion so as to provide the user motion to the controller 150.

The memory 160 includes a read only memory (ROM), a random access memory, and a voice memory used for storing a plurality of programs and information required when the operation of the mobile communication terminal 150 is controlled. In addition, the memory 160 stores control commands according to at least one motion pattern and characters according to predetermined traces according to the present invention.

In addition, the RF module 110 transmits/receives an RF signal to/from a base station through an antenna. The RF module 110 converts a received signal into an intermediate frequency (IF) signal and outputs the converted signal to the base band processing module 120. The RF module 110 converts an IF signal input from the base band processing module 120 into an RF signal and transmits the RF signal. In addition, the base band processing module 120 is a base band analog Application Specific Integrated Circuit (ASIC) providing an interface between the controller 150 and the RF module 110. The base band processing module 120 converts a base band digital signal input from the controller 150 into an analog IF signal so as to apply the analog IF signal to the RF module 110, and converts an analog IF signal input from the RF module 100 into a base band digital signal so as to apply the base band digital signal to the controller 150.

The audio processing module 140 outputs received audio data after converting the audio data into audible sound through a speaker under the control of the controller 150. The audio processing module 140 converts an audio signal input from a user through a microphone into an electrical signal to be transmitted to the controller 150. The user interface 130 includes a plurality of numeric keys and functions and outputs key-input data corresponding to a key pressed by the user to the controller 150. The display 170 generally includes a liquid crystal display (LCD) and displays a variety of messages and icons under the control of the controller.

Figure 2:
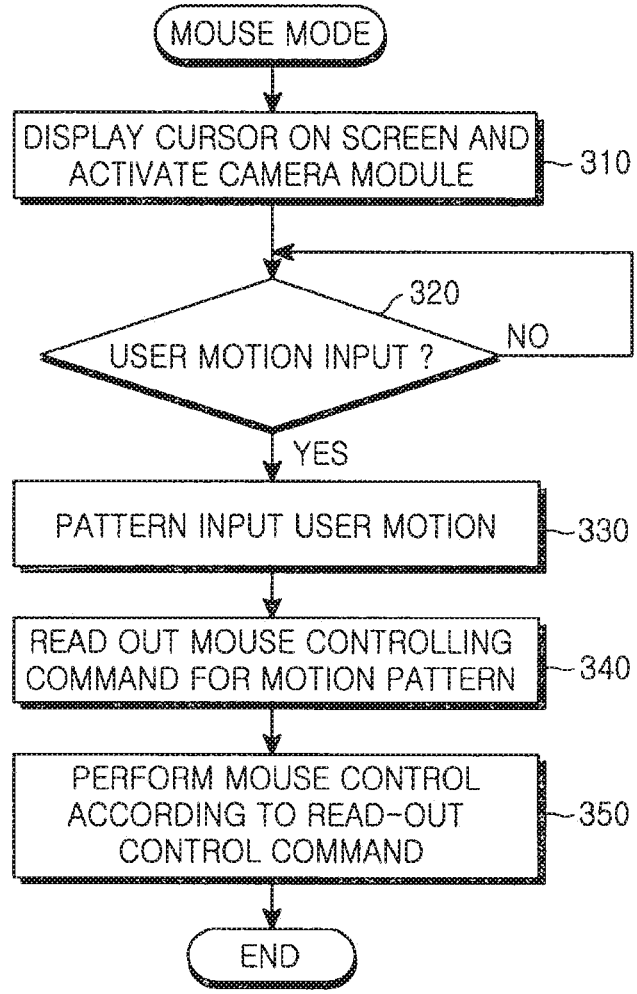
FIG. 2 is a flowchart illustrating a method for realizing a user interface using a camera module according to a first embodiment of the present invention.
Figure 3:
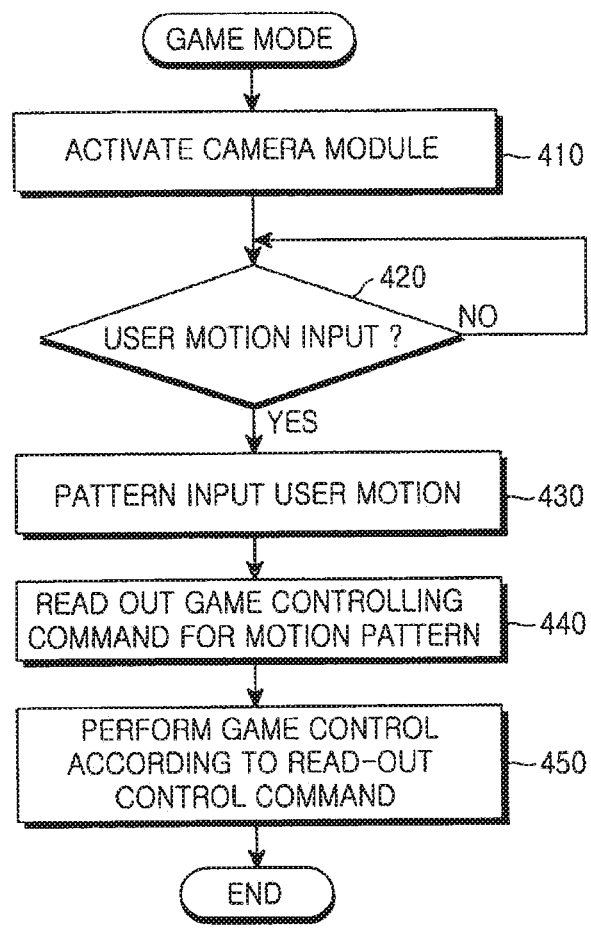
FIG. 3 is a flowchart illustrating a method for realizing a user interface using a camera module according to a second embodiment of the present invention.
Figure 4:
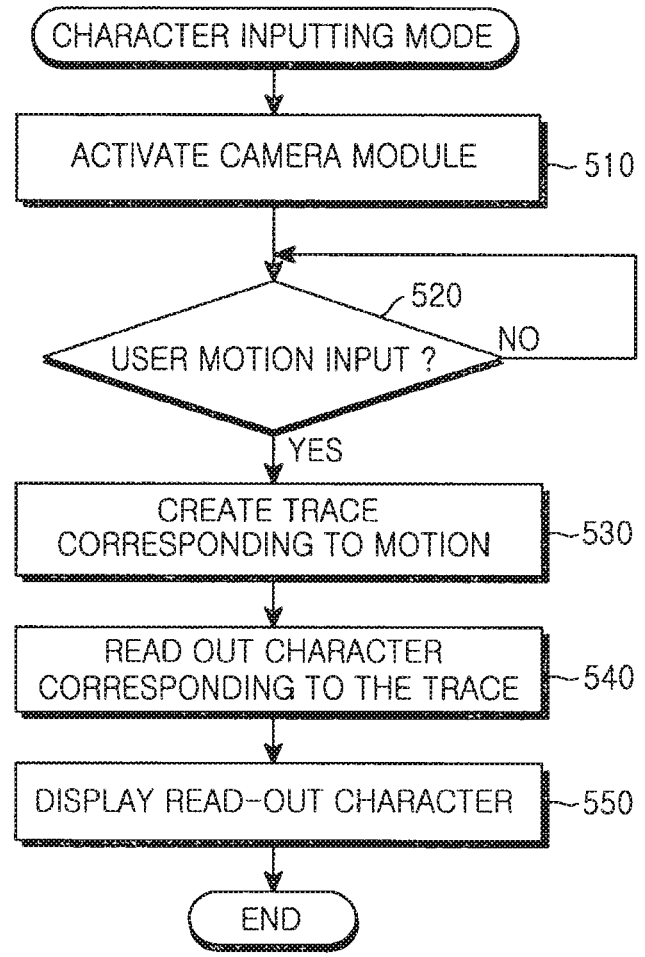
FIG. 4 is a flowchart illustrating a method for realizing a user interface using a camera module according to a third embodiment of the present invention.

FIGS. 2 to 4 are flowcharts illustrating a control procedure employed for realizing the user interface using the camera module according to the embodiments of the present invention, and FIG. 2 illustrates a case in which the user interface is realized using the camera module in a mouse mode.

Referring to FIG. 2, under the mouse mode, the controller 150 displays a cursor on a screen of the display 170 and activates the camera module 190 in step 310. In this case, the cursor may be displayed or not. Then, the controller 150 determines if a user motion is input in step 320. If the user motion is input, the controller 150 goes into step 330 and controls the motion recognition module 180 to pattern the user motion. If the motion recognition module 180 patterns the user motion to be provided to the controller 150, the controller 150 in step 340 reads out from the memory 160 a mouse controlling command corresponding to the motion pattern. Thereafter, the controller 150 executes the mouse controlling command according to the read-out mouse controlling command in step 350. For example, if the user makes a mouse click motion using his/her hand as if the user actually clicks the mouse, the controller 150 performs a control motion corresponding to a case in which the user clicks a menu item or an Internet icon for which a cursor displayed on the screen of the display 170 is positioned. If the user performs a motion of rolling the mouse wheel as if the user actually rolls the mouse wheel, the controller 150 moves the cursor displayed on the screen of the display 170 correspondingly to the mouse wheel turning motion.

FIG. 3 illustrates a case in which the user interface is realized using the camera module in a game mode.

Referring to FIG. 3, under the game mode, the controller 150 activates the camera module 190 in step 410. Thereafter, the controller 150 determines if the user motion is input in step 420. If the user motion is input, the controller 150 goes into step 430 and controls the motion recognition module 180 to pattern the user motion. If the motion recognition module 180 patterns the user motion to be provided to the controller 150, the controller 150 in step 440 reads out from the memory 160 a game controlling command corresponding to the motion pattern. Thereafter, the controller 150 executes the game controlling command according to the read-out game controlling command in step 450. For example, if the user makes motions such as gripping, hitting, or moving by using his/her hand as if the user is actually playing a game, the controller 150 reads out from the memory 160 the game controlling command for a corresponding motion and executes the game controlling command.

FIG. 4 illustrates a case in which the user interface is realized using the camera module in a character inputting mode.

Referring to FIG. 4, under the game mode, the controller 150 activates the camera module 190 in step 510. Thereafter, the controller 150 determines if a user motion is input in step 520. If the user motion is input, the controller 150 goes into step 530 and controls the character recognition module 200 to create the trace corresponding to the user motion. If the character recognition module 200 creates the trace corresponding to the user motion to be provided to the controller 150, the controller 150 reads out from the memory the appropriate one of 160 available characters corresponding to the trace in step 540 and displays the read-out characters in step 550. This character inputting function can be usefully used when a Short Message Service (SMS) message is written or when a schedule is made.

As described above, according to the present invention, a user interface module is realized by using a camera module included in a mobile communication terminal, so that it is possible to expand an application function of the camera module and improve user convenience for the usage of the mobile communication terminal.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. An apparatus comprising:
   a memory configured to store a first instruction corresponding to a first function to be provided by the apparatus, and a second instruction corresponding to a second function to be provided by the apparatus; and
   a controller configured to:
      activate a camera operatively coupled with the apparatus based at least in part on a specified application;
      analyze images obtained by the camera;
      recognize a user motion represented in the images based at least on the analyzing;
      perform the first function according to the first instruction in response to the user motion if the specified application is a first specified application; and
      perform the second function according to the second instruction in response to the user motion if the specified application is a second specified application.

2. The apparatus of claim 1, wherein the controller is further configured to:
   perform a corresponding one of the first function and the second function according to the user motion as if the user motion is received via a mouse operatively coupled with the apparatus.

3. The apparatus of claim 1, wherein the controller is further configured to:
   perform a corresponding one of the first function and the second function according to the user motion as if the user motion were an input received via a key operatively coupled with the apparatus.

4. The apparatus of claim 1, wherein the controller is further configured to:
   present, via a display operatively coupled with the apparatus, an indication corresponding to the user motion.

5. The apparatus of claim 4, wherein the controller is further configured to:
   move, as at least part of the presenting, the indication from a first location to a second location in the display in response to the user motion.

6. The apparatus of claim 1, wherein the controller is further configured to:
   present, via a display operatively coupled with the apparatus, one or more menus or one or more icons as at least part of executing of the specified application; and
   select a menu of the one or more menus or an icon of the one or more icons, as at least part of the performing of a corresponding one of the first function and the second function.

7. The apparatus of claim 1, wherein the controller is further configured to:
   determine a character based at least in part on a trace corresponding to the user motion, as at least part of the performing of a corresponding one of the first function and the second function.

8. The apparatus of claim 7, wherein the controller is further configured to:

provide the character to the apparatus as at least part of an input.

9. The apparatus of claim 7, further comprising a transceiver, wherein the controller is further configured to:
   transmit, using the transceiver, the character to an external electronic device.

10. A method comprising:
    activating, at an electronic device, a camera operatively coupled with the electronic device based at least in part on a specified application;
    analyzing images obtained by the camera;
    recognizing a user motion represented in the images based at least on the analyzing;
    performing a first function in response to the user motion if the specified application is a first specified application; and
    performing a second function in response to the user motion if the specified application is a second specified application.

11. The method of claim 10, wherein performing a corresponding one of the first function and the second function comprises:
    presenting, via a display operatively coupled with the electronic device, an indication corresponding to the user motion.

12. The method of claim 11, wherein the presenting comprises:
    moving the indication from a first location to a second location in the display in response to the user motion.

13. The method of claim 10, wherein performing a corresponding one of the first function and the second function comprises:
    presenting a character pattern based at least in part on a trace corresponding to the user motion.

14. The method of claim 10, wherein performing a corresponding one of the first function and the second function comprises:
    selecting a menu of one or more menus or an icon of one or more icons presented via a display operatively coupled with the apparatus.

15. A non-transitory machine-readable storage device storing instructions that, when executed by one or more processors, cause the one or more processors to perform operations comprising:
    identifying, at an electronic device, a camera operatively coupled with the electronic device based at least in part on a specified application;
    analyzing images obtained by the camera;
    recognizing a user motion represented in the images based at least on the analyzing;
    performing a first function in response to the user motion if the specified application is a first specified application; and
    performing a second function in response to the user motion if the specified application is a second specified application.

16. The non-transitory machine-readable storage device of claim 15, wherein the identifying comprises:
    activating the camera based at least in part on a determination that the specified application corresponds to a specified game application.

17. The non-transitory machine-readable storage device of claim 15, wherein the performing of a corresponding one of the first function and the second function comprises:
    providing, via an output device operatively coupled with the electronic device, a user interface in relation with the specified application, the user interface representing an action corresponding to the user motion.

18. The non-transitory machine-readable storage device of claim 15, wherein the performing of a corresponding one of the first function and the second function comprises:
    presenting, via a display operatively coupled with the electronic device, an indication corresponding to the user motion.

19. The non-transitory machine-readable storage device of claim 18, wherein the presenting comprises:
    moving the indication from a first location to a second location in the display in response to the user motion.

20. The non-transitory machine-readable storage device of claim 15, wherein performing a corresponding one of the first function and the second function comprises:
    selecting a menu of one or more menus or an icon of one or more icons presented via a display operatively coupled with the apparatus.

* * * * *